United States Patent Office 3,318,165
Patented May 9, 1967

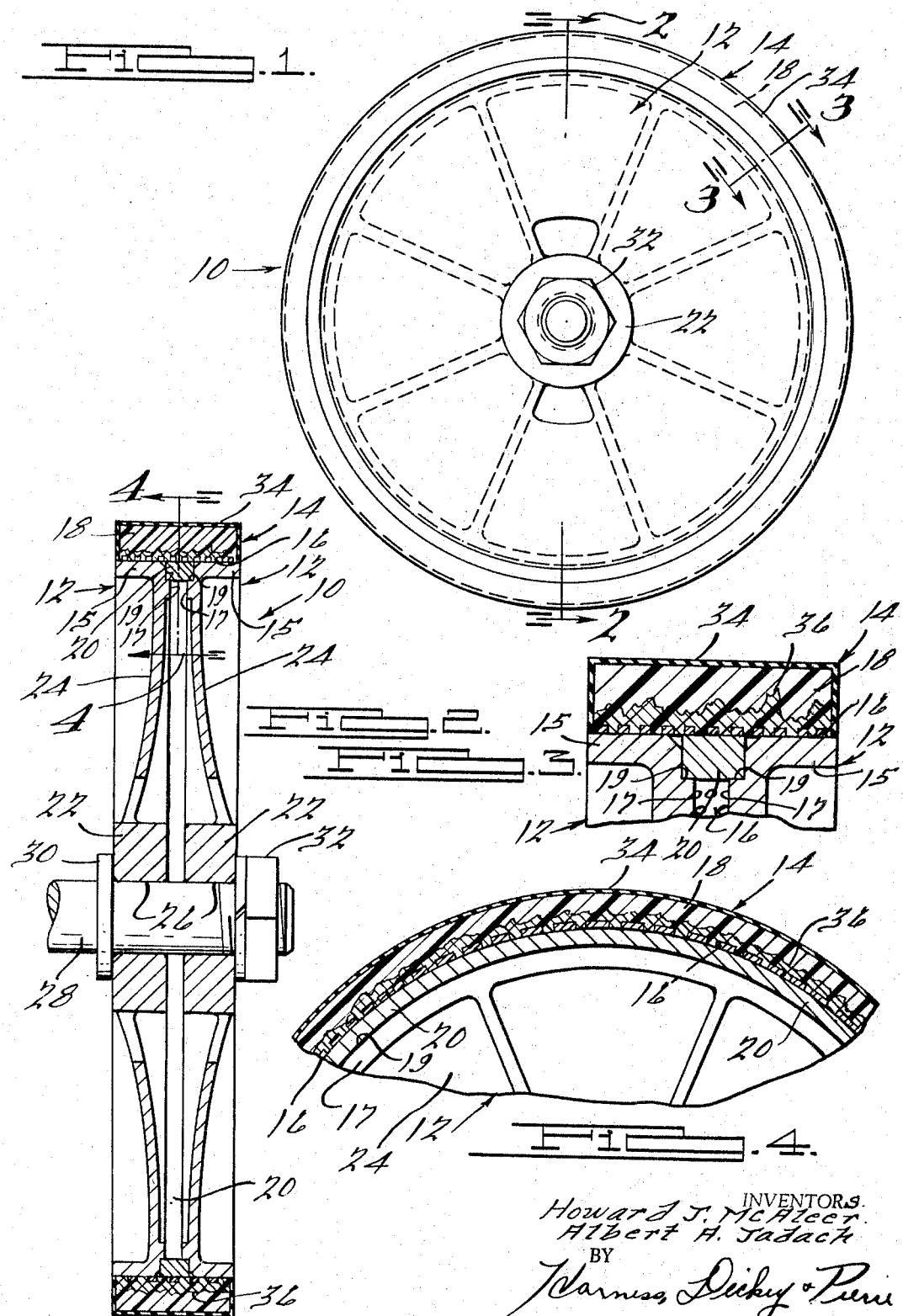

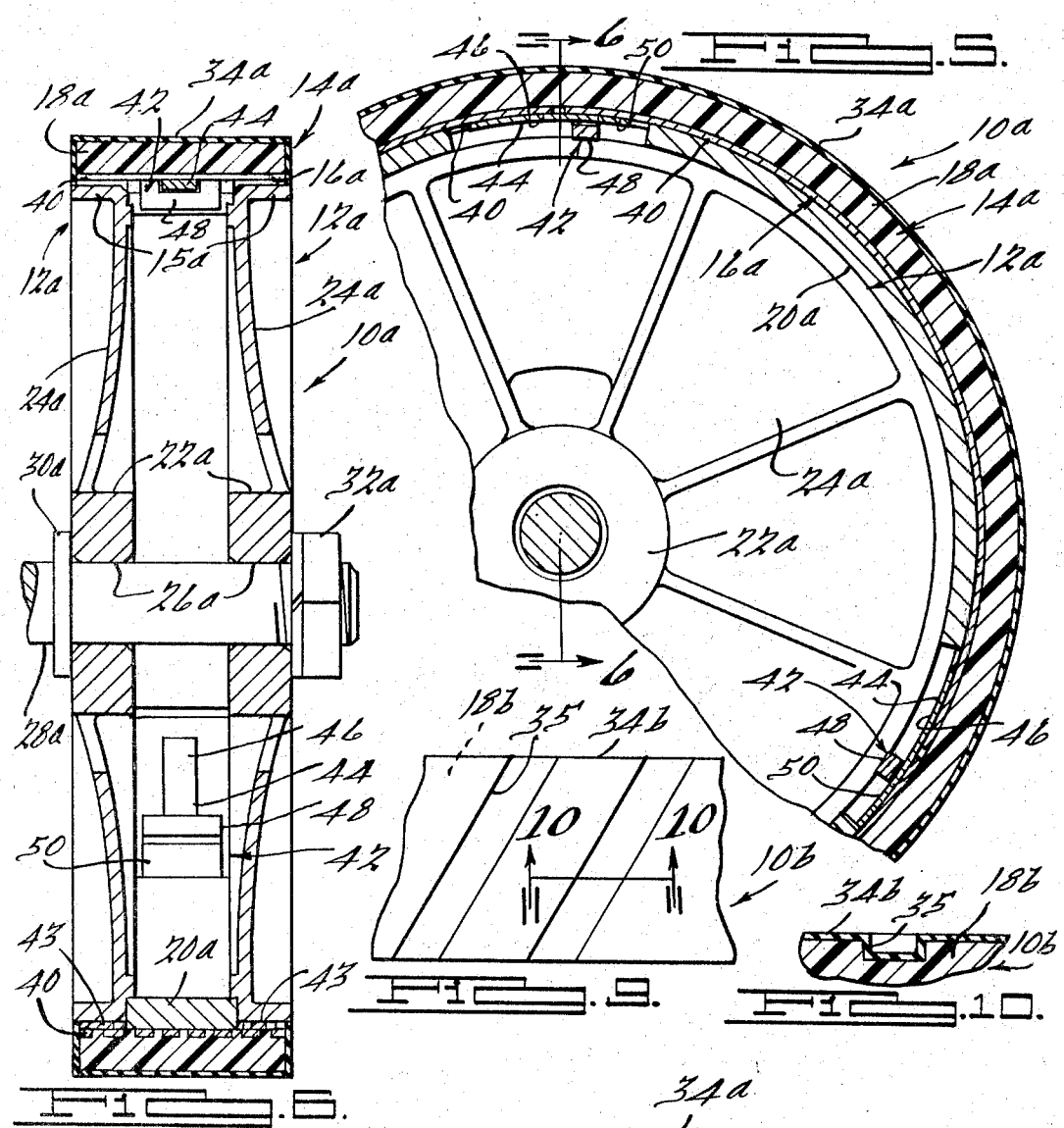

3,318,165
CONTACT WHEEL
Howard J. McAleer, Detroit, and Albert A. Jadach, Royal Oak, Mich., assignors to Formax Manufacturing Corporation, Detroit, Mich., a corporation of Michigan
Filed May 25, 1964, Ser. No. 370,011
15 Claims. (Cl. 74—230.7)

This invention relates to contact wheels for use in machining workpieces.

A contact wheel as referred to herein is that type which supports and imparts rotation to an abrading (or other similar type) belt or band and against the face of which a workpiece is moved to perform a desired finishing operation. Since considerable forces are exerted upon the contact wheel it must have substantial support across its width to prevent buckling, etc., and hence uneven machining. It is typical to form the contact wheel with a rim made of a rubber or plastic material which is bonded to a sturdy metal hub. In order for the rim to be able to more readily conform to the contour of the workpiece being finished it is desirable that the rim be soft, resilient, and pliable. Such a soft rim is more efficient than harder rims since by conforming more readily to the contour of the workpiece more of the belt or band is used. However, in providing such a rim with prior contact wheel constructions it has been found that the rim wears rapidly. Since the hub of the wheel is made of a substantial construction, i.e., an expensive casting or stamping, rapid wear of the rim results in a costly replacement. Because of this fact and because of the lack of a suitable material for a soft rim, the tendency has been to make contact wheels with the rim made of a hard material to provide adequate life, resulting, however, in poorer finishing and work characteristics. In some instances because of the high cost of the hub the worn contact wheel is sent back to the manufacturer for removal of the worn rim and for replacement with a new rim; this, of course, requires the rim to be stripped from the hub, the hub cleaned, etc., and a new rim to be molded or otherwise bonded to the hub.

In the present invention the above listed problems have been eliminated by providing a contact wheel in which the rim is readily removable from the hub and is of an inexpensive construction and hence is readily disposable and replaceable.

In an alternate construction an expandable contact wheel is shown for use with an annular band of abrading material, or the like. This construction has, among others, the advantage of not requiring the use of a belt or other extensive length of work material; this construction, of course, can be used with a belt if desired.

It is therefore a general object of this invention to provide a contact wheel having a novel construction. It is another object of this invention to provide a contact wheel construction utilizing a rim which is readily removable from the hub and which is inexpensive and easily replaceable. It is another object to provide a contact wheel having an expandable rim for use with an annular band of work material.

Other objects, features, and advantages of the present invention will become apparent from the subsequent description and the appended claims, taken in conjunction with the accompanying drawings, in which:

FIGURE 1 is a side elevational view of a contact wheel embodying features of the present invention;

FIGURE 2 is a diametrical sectional view to increased scale of the contact wheel of FIGURE 1 taken substantially along the line 2—2;

FIGURE 3 is a sectional view to increased scale of the contact wheel of FIGURE 1 taken substantially along the line 3—3;

FIGURE 4 is a fragmentary, sectional view to increased scale of the contact wheel of FIGURES 1–3 taken substantially along the line 4—4 in FIGURE 2;

FIGURE 5 is a fragmentary, sectional side elevational view of a modified contact wheel;

FIGURE 6 is a diametrical sectional view of the modified contact wheel of FIGURE 5, taken substantially along the line 6—6;

FIGURE 7 is a fragmentary sectional view of a portion of the rim of the modified contact wheel of FIGURES 5 and 6;

FIGURE 8 is a view of the rim of FIGURE 7 taken substantially in the direction of the arrows 8—8 in FIGURE 7;

FIGURE 9 is a fragmentary, end elevational view of a contact wheel having a modified peripheral surface; and FIGURE 10 is a sectional view of the wheel of FIGURE 9 taken substantially along the line 10—10.

Looking now to FIGURES 1–4, a contact wheel embodying the features of the present invention is generally indicated by the numeral 10 and comprises a pair of identically formed hubs or flanges 12 which support at their radially outer peripheries a removable and disposable rim 14. The rim 14 includes an inner metal band 16 onto which is bonded or glued a soft, flexible annular ring 18 of an elastomer, which is preferably flexible polyurethane or some other similar elastic material. The flexible ring 18 can be glued, molded or otherwise secured to the metal band 16; in order to improve the bond therebetween, in the preferred embodiment, the metal band 16 is perforated to form openings into which either the glue or the material of the ring 18 can flow in either the gluing or molding process whereby an additional mechanical interlock is formed. Contact wheels, such as that of the present invention, are operated at relatively high speeds at which the inertial forces can become significant; hence, in order to prevent undue radial expansion it is important that the metal band 16 not be weakened excessively by removing too much material in the formation of the perforations. Alternatively, the metal band 16 could be made imperforate with its outer surface being scored or otherwise roughened in order to insure a good bond with the resilient ring 18 in either the gluing or molding process. In the preferred form the resilient ring 18 is made of flexible urethane; it has been found that soft, flexible urethane does not grow excessively radially at high speeds as contrasted to soft rubber-like materials, e.g., sponge rubber, of comparable hardness, i.e., approximately 15 Shore durometer on the C scale, which do grow excessively and are substantially unsuitable for such high speed applications.

Each of the flanges 12 has an annular, axially extending ring portion 15 which has an outside diameter substantially equal to the inside diameter of the metal band 16 whereby the metal band 16 and the resilient ring 18 can be assembled with a snug fit with the flanges 12. The flanges 12 are inserted from opposite sides with the free ends of the axially extending ring portions 15 extending away from each other and with the opposite ends of the ring portions 15 being movable into gripping engagement with an annular circumferentially extending ring member 20 which is secured to the radially inner surface of the metal band 16 by welding or other suitable means. These opposite ends of ring portions 15 are chamfered to facilitate insertion of the flanges 12 within the rim 14. The ring member 20 is of a uniform width and is located substantially centrally of the width of the metallic band 16. As the flanges 12 are moved axially towards each other, the confronting ends of the annular ring portions 15 are moved into clamping engagement with the ring member 20 to thereby securely grip the rim 14; thus the ring member 20 acts as means to be clamped, as means to properly locate the flanges 12 within the rim 14, and as means radially stiffening the rim 14. Each of the flanges 12 has an annular radially outwardly extending boss 17 which has an annular radially outer seat 19 which is matable within the ring member 20 for additionally supporting the rim 14.

Each of the flanges 12 is provided with a central hub portion 22 which is connected to the annular ring portion 15 by means of a web portion 24 which extends from the axially inner end of ring portion 15 to the axially outer end of the hub portion 22. Thus the web portion 24 is recessed axially inwardly at its outer end and provides clearance for odd shaped workpieces. The hub portion 22 has a central bore 26 whereby the flange 12 can be assembled upon a spindle or arbor member 28. As shown in FIGURE 2, the arbor member 28 is threaded at one end and has spaced therefrom a shoulder portion 30 against which the flanges can clamped by means of a nut 32. As the flanges 12 are clamped together they are moved into gripping engagement with the ring member 20 to thereby securely grip the rim 14.

As previously noted, the resilient ring 18 can be made of polyurethane or some other resilient, soft, pliable material which readily deforms or takes the shape of the workpiece being machined. However, in order to provide greater strength at the outer surface of the ring portion 18, a thin, tough coating 34 of elastic material can be applied thereto. The coating 34 is applied not only to the radially outer surface of ring 18 but to the edges as well since often the workpiece being finished can contact these edges. If the softness or pliability of the ring 18 is desired to be maintained than a thin coating of a material such as vinyl or latex or synthetic rubber can be used. If it is desired to stiffen the ring 18 than the skin 34 can be made of solid urethane or a harder latex or synthetic rubber with the thickness varied depending upon the change in hardness desired.

Looking now to FIGURES 9 and 10 a modified contact wheel 10b is shown in which the radially outer surface of the ring 18b is provided with a plurality of circumferentially spaced axially extending grooves 35 which are skewed relative to the axis of the wheel 10b; the grooves 35 provide greater flexibility of the outer surface and also provide better gripping of the work belt or band. With grooves 35 the skin 34b, is even more useful in preventing premature wear of the contact surface of wheel 10b. The grooves 35 also enhance the cooling of the wheel 10b and hence of the surface of the belt or band engaging the workpiece thus reducing the tendency of the belt or band to load up. Except for the grooves 35, the wheel 10b of FIGURES 9 and 10 is similar to wheel 10 of FIGURES 1–4.

It has been found that in addition to the wear occasioned at the outer periphery of the resilient ring 18, there can be failure of rim 14 caused by the resilient ring 18 tearing from its metal band 16 along a surface adjacent thereto. It has been found that by gluing the resilient ring 18 to the metal band 16, the glue flows between the cells immediately adjacent to the band 16 and adds strength thereto and also inhibits tearing there because of the random pattern of the dispersion of the glue (as illustrated in FIGURES 2, 3 and 4 by the numeral 36) whereby no continuous band or surface is defined at which tearing can originate. In other words, the radial discontinuity of the glue pattern prevents the definition at a critical point along the ring 18 of a particular continuous band or surface at which tearing might begin. Hence this provides for a rim 14 of greater strength and longer life; this is especially true where soft materials, i.e. having a Shore durometer around 15 on the C scale, having larger cell structure, e.g. flexible urethane, are used.

The flanges 12 radially support the lightweight rim 14 over substantially its entire width thereby preventing buckling, etc. Upon wear of the rim 14 it can be easily removed from the flanges 12 and replaced by a new rim and because of its extremely low cost it can be discarded without incurring a severe cost penalty. Because of the low cost, disposable feature of the construction of the contact wheel rim 14 the resilient ring 18 can be made of a soft, pliable material to provide for optimum machining conditions without the fear of expensive replacements. The ease of replacement of the rim 14 also permits the substitution of rims having different hardness for different job requirements. With the above construction the rim 14 can utilize a soft material, Shore durometer around 15 on the C scale, and have an adequate life while providing all of the advantages inherent with such a soft material and still be relatively inexpensive to use.

The embodiment of FIGURES 1–4 is primarily for use with a belt of abrasive material in which the belt extends over both the contact wheel and an auxiliary wheel and is maintained in tension and can be driven either by means of the contact wheel itself or by means of the auxiliary wheel. The embodiment of FIGURES 5–8 depicts a modified contact wheel which can be used either with a belt of abrasive material with an auxiliary wheel or solely with a band of abrasive material, without, of course, the need for an auxiliary wheel. In the description of the embodiment of FIGURES 5–8 components similar to like components in the embodiment of FIGURES 1–4 have been given the same number with the addition of a letter subscript and, unless specifically pointed out, the similarly numbered components are assumed to be substantially the same.

Thus in looking to FIGURES 5–8 a contact wheel 10a is shown which differs from the contact wheel 10 of FIGURES 1–4 primarily in the construction of the metal band 16a of the rim 14a. The metal band 16a is formed of two or more separate portions 40 (three are shown) which are held together at their confronting ends by sliding lock assemblies 42. Each of the assemblies 42 is made up of a T-shaped slide member 44 having an elongated portion 46 fixed at one end to the end of one of the band portions 40 and extending partially over the end of the adjacent one of the band portions 40 and through a slot in a channel member 48 fixed to that end of the adjacent one of the band portions 40. The opposite end of the elongated portion 46 terminates in a cross piece 50 which locks the channel member 48 and the slide member 44 together while permitting some relative movement therebetween and hence permits similar relative movement between adjacent band portions 40. The lock assemblies 42 are located between reinforcing strips 43 located on opposite axial sides of each of the band portions 40.

The assemblies 42 are designed to permit a maximum circumferential separation between the ends of adjacent band portions 40 such that the band 16a defines a maximum effective inside diameter substantially equal to the outside diameter of the flanges 12a whereby the metal band 16a can be assembled with a snug fit onto the flanges 12a. The resilient ring 18a is fixed to the band 16a, by molding or gluing, with the band 16a in its contracted or minimum diameter condition. Thus, as the band 16a is expanded in order to be assembled onto the flanges 12a the ring 18a is stretched and resiliently urges the band portions 40 together and hence provides a force whereby the flanges 12a are circumferentially gripped. When using the contact wheel 10a with a band of abrasive material, that band defines a diameter substantially equal to the outside diameter of the wheel 10a whereby it can be snugly received with a slight circumferential preload. Assembly of such an abrasive band would be difficult with a nonexpansible wheel. However, with the contact wheel 10a the abrasive band can be located over the expansible rim 14a in its contracted or minimum diameter condition and then, of course, placed under a preload as the rim 14a is expanded for assembly onto the flanges 12a. Note that the band is always held under this preload as long as the flanges 12a are assembled to the rim 14a;

this is a decided advantage over these wheels in which the preload is provided solely by centrifugal expansion of the rim under rotation.

As previously noted the rim 14a, as assembled onto the flanges 12a, is at its maximum diameter with further expansion being prevented by engagement between the cross piece 50 of slide member 44 and the channel member 48. This lock up of the assemblies 42 prevents the occurrence of unwanted radial expansion from inertial forces caused by the high speed of rotation of the contact wheel 10a. Three band portions 40 are used to distribute the total amount of separation to three locations to prevent the occurrence of any appreciable out of round condition at these locations of separation. At the same time a ring segment 20a is provided with each of the band portions 40 and each is provided to be of a uniform, selected width and is engageable by the confronting ends of ring portions 15a of flanges 12a to properly locate the flanges 12a and also to provide means whereby the rim 14a can be gripped by the flanges 12a.

In addition to the other advantages noted above for the contact wheel 10a, the latter contact wheel also has the advantages previously noted of the contact wheel 10 and can likewise be provided with the grooves 35 of the contact wheel 10b of FIGURES 9 and 10. Thus the rim 14a can be easily removed from the flanges 12a and replaced by a new one and can be discarded without incurring a severe cost penalty.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A contact wheel comprising: a disposable rim member having an annular metallic band having a plurality of radial separations each defining ends which are movable towards and away from each other to decrease and increase the effective diameter of said band, lock means fixed to said ends for limiting the magnitude of said radial separation with said band defining when expanded a selected maximum effective diameter, said lock means comprising a slotted channel member fixed to one of said ends and a T-shaped slide member, said slide member having an elongated slide portion fixed at one end to the other of said ends and slidable within the slot of said channel member, said slide member having a cross portion at the opposite end of said slide portion engageable with said slide member for limiting the relative movement between said slide and channel members with said band in its expanded position, said rim member having a soft, flexible annular ring of elastomeric material supported upon and fixed to the outer surface of said band, said ring member, when relaxed, having an internal diameter of a size less than said maximum diameter for urging said ends together when said band is radially expanded, a ring segment fixed to the radially inner surface of said band between each pair of said radial separations, and a pair of flanges having a pair of annular ring portions located within and on opposite axial sides of said rim member for radially supporting said rim member, said flanges being movable axially towards each other with said ring portions being moved into clamping engagement with each said segment for preventing relative axial and rotational movement between said flanges and said rim member, each said segment being of a uniform, preselected width for locating said flanges within said rim portion at selected positions.

2. A contact wheel comprising: a disposable rim member having an annular metallic band having a plurality of radial separations each defining ends which are movable towards and away from each other to decrease and increase the effective diameter of said band, lock means fixed to said ends for limiting the magnitude of said radial separation with said band defining when expanded a selected maximum effective diameter, said lock means comprising a slotted channel member fixed to one of said ends and a slide member fixed to the other of said ends and slidable within the slot of said channel member, said slide member having a portion engageable with said slide member for limiting the relative movement between said slide and channel members with said band in its expanded position, said rim member having a soft, flexible annular ring member of an elastomeric material supported upon and fixed to the outer surface of said band, said soft ring, when relaxed, having an internal diameter of a size less than said maximum diameter for urging said ends together when said band is radially expanded, a ring segment fixed to the radially inner surface of said band between each pair of said radial separations, and a pair of flanges having a pair of annular ring portions located within and on opposite axial sides of said rim member for radially supporting said rim member, said flanges being movable axially towards each other with said ring portions being moved into clamping engagement with each said segment for preventing relative axial and rotational movement between said flanges and said rim member, each said segment being of a uniform, preselected width for locating said flanges within said rim portion at selected positions, each of said flanges having an annular, axially extending boss having a radially outer surface located within each said segment for supporting each said segment.

3. A contact wheel comprising: a disposable rim member having an annular metallic band having a plurality of radial separations each defining ends which are movable towards and away from each other to decrease and increase the effective diameter of said band, lock means fixed to said ends for limiting the magnitude of said radial separation with said band defining when expanded a selected maximum effective diameter, said lock means comprising a slotted channel member fixed to one of said ends and a slide member fixed to the other of said ends and a slide member fixed to the other of said ends and slidable within the slot of said channel member, said slide member having a portion engageable with said slide member for limiting the relative movement between said slide and channel members with said band in its expanded position, said rim member having a soft, flexible annular ring member of an elastomeric material supported upon and fixed to the outer surface of said band, said soft ring, when relaxed, having an internal diameter of a size less than said maximum diameter for urging said ends together when said band is radially expanded, a ring segment fixed to the radially inner surface of said band between each pair of said radial separations, and a pair of flanges having a pair of annular ring portions located within and on opposite axial sides of said rim member for radially supporting said rim member, said flanges being movable axially towards each other with said ring portions being moved into clamping engagement with each said segment for preventing relative axial and rotational movement between said flanges and said rim member, each said segment being of a uniform, preselected width for locating said flanges within said rim portion at selected positions.

4. A contact wheel comprising: a disposable rim member having an annular metallic band having a plurality of radial separations each defining ends which are movable towards and away from each other to decrease and increase the effective diameter of said band, lock means fixed to said ends for limiting the magnitude of said radial separation with said band defining, when expanded, a selected maximum effective diameter, said lock means comprising a slotted channel member fixed to one of said ends and a slide member fixed to the other of said ends and slidable within the slot of said channel member, said slide member having a portion engageable with said channel member for limiting the relative movement between said slide and channel members with said band in its expanded position, said rim member having a soft, flexible annular ring of an elastomeric material supported upon and fixed to the outer surface of said band, said soft ring, when relaxed, having an internal diameter of a size less than said maximum diameter for urging said ends together when said band is radially expanded, a ring segment fixed to the radially inner surface of said band between each pair of said radial separations, and flange means located within said rim member for radially supporting said rim member at an effective diameter greater than that defined with said ends together whereby said rim member resiliently grips said flange means, said flange means including means engageable with each said ring segment for preventing relative axial and rotational movement between said flange means and said rim member.

5. A contact wheel comprising: a disposable rim member having an annular metallic band having a radial separation defining ends which are movable towards and away from each other to decrease and increase the effective diameter of said band, lock means fixed to said ends for limiting the magnitude of said radial separation with said band defining a selected maximum effective diameter, said lock means comprising a slotted channel member fixed to one of said ends and a slide member fixed to the other of said ends and slidable within the slot of said channel member, said slide member having a portion engageable with said channel member for limiting the relative movement between said slide and channel members with said band in its expanded position, said rim member having a soft, flexible annular ring member of an elastomeric material supported upon and fixed to the outer surface of said band, said ring member when relaxed having an internal diameter of a size less than said maximum diameter for urging said ends together when said band is radially expanded, separable ring means located on the radially inner surface of said band for being engaged whereby said rim member can be driven, and flange means located within said rim member for radially supporting said rim member at an effective diameter greater than that defined with said ends together whereby said rim member resiliently grips said flange means, said flange means including means selectively engageable with said ring means for preventing relative axial and rotational movement between said flange means and said rim member.

6. A contact wheel comprising: a disposable rim member having an annular metallic band having a radial separation defining ends which are movable towards and away from each other to decrease and increase the effective diameter of said band, lock means fixed to said ends for limiting the magnitude of said radial separation with said band defining a selected maximum effective diameter, said lock means comprising a pair of mutually engageable lock members each fixed to a different one of said ends, said rim member having a soft, flexible annular ring of elastomeric material supported upon and fixed to the outer surface of said band, said soft ring when relaxed having an internal diameter of a size less than said maximum diameter for urging said ends together when said band is radially expanded, separable ring means located on the radially inner surface of said band for being engaged whereby said rim member can be driven and flange means located within said rim member for radially supporting said rim member at an effective diameter greater than that defined with said ends together whereby said rim member resiliently grips said flange means, said flange means including means selectively engageable with said ring means for preventing relative axial and rotational movement between said flange means and said rim member.

7. A contact wheel comprising: a disposable rim member having an annular metallic band having a radial separation defining ends which are movable towards and away from each other to decrease and increase the effective diameter of said band, means fixed to said ends for limiting the magnitude of said radial separation with said band defining a selected maximum effective diameter, said rim member having a soft, flexible annular ring of elastomeric material supported upon and fixed to the outer surface of said band, said soft ring when relaxed having an internal diameter of a size less than said maximum diameter for urging said ends together when said band is radially expanded, and flange means located within said rim member for radially supporting said rim member at an effective diameter greater than that defined with said ends together whereby said rim member resiliently grips said flange means, said rim member having engaging means fixed to said band member for being engaged by said flange means, said flange means including means engageable with said engaging means for preventing relative axial and rotational movement between said flange means and said rim member.

8. A contact wheel comprising: a disposable rim member having an annular metallic band having a radial separation defining ends which are movable towards and away from each other to decrease and increase the effective diameter of said band, means fixed to said ends for limiting the magnitude of said radial separation with said band defining a selected maximum effective diameter, said rim member having a soft, flexible annular ring of elastomeric material supported upon and fixed to the outer surface of said band, said soft ring, when relaxed, having an internal diameter of a size less than said maximum diameter for urging said ends together when said band is radially expanded, and flange means located within said rim member for radially supporting said rim member at an effective diameter greater than that defined with said ends together whereby said rim member resiliently grips said flange means.

9. A contact wheel comprising: a disposable rim member having an annular, metallic band member, an annular ring of flexible polyurethane supported upon and fixed to the outer surface of said band member, and an annular ring member fixed to said band member; and a pair of flanges located on opposite axial sides of and within said rim member with each having an annular ring portion for radially supporting said rim member and being axially movable towards each other into frictional, clamping engagement with said ring member for preventing relative axial and rotational movement between said flanges and said rim member, said ring member having a preselected uniform width for locating said flanges within said rim member at selected positions, and means located along the axis of said contact wheel for removably holding said flanges in frictional engagement with said ring member.

10. A contact wheel comprising: a disposable rim member having an annular metallic band member, a soft, flexible annular ring of an elastomeric material supported upon and fixed to the outer surface of said band member, and an annular ring member fixed to said band member; flange means located within said rim member for radially supporting said rim member and being selectively movable into frictional engagement with said ring member for preventing relative axial and rotational movement between said flange means and said rim member; and means located along the axis of said contact wheel for providing a clamping force for selectively, removably holding said flange means in said frictional engagement.

11. A contact wheel comprising: a disposable rim member having an annular band member of a hard material and a soft, flexible annular ring of an elastomeric material having a Shore durometer on the C scale of approximately 15 supported upon and fixed to the outer surface of said band member, said soft ring having a plurality of circumferentially spaced, generally axially extending grooves in its radially outer periphery, a thin coating of tough, resilient material covering the exposed surface of said soft ring, flange means located within said rim member for radially supporting said rim member and being selectively movable into and out of engagement with said rim member, said rim member having engaging means fixed to said band member for being engaged by said flange means, said flange means including means frictionally engageable with said engaging means for preventing relative axial and rotational movement between said flange means and said rim member and means located along the axis of said contact wheel for providing a clamping force for selectively removably holding said flange means in frictional engagement with said engaging means.

12. A contact wheel comprising: a disposable rim member having an annular band member of a hard material and a soft, annular ring of flexible urethane having a Shore durometer on the C scale of approximately 15 supported upon and fixed to the outer surface of said band member, a thin coating of tough, resilient material covering the exposed surface of said soft ring, flange means located within said rim member for radially supporting said rim member and being selectively movable into and out of engagement with said rim member, said rim member having engaging means fixed to said band member for being engaged by said flange means, said flange means including means frictionally engageable with said engaging means for preventing relative axial and rotational movement between said flange means and said rim member, and means located along the axis of said contact wheel for providing a clamping force for selectively removably holding said flange means in frictional engagement with said engaging means.

13. A contact wheel comprising: a disposable rim member having an annular band member of a hard material and a soft, flexbile annular ring of an elastomeric material having a Shore durometer on the C scale of approximately 15 supported upon and fixed to the outer surface of said band member, a thin coating of tough, resilient material covering the exposed surface of said soft ring, flange means located within said rim member for radially supporting said rim member and being selectively movable into and out of engagement with said rim member, said rim member having engaging means fixed to said band member for being engaged by said flange means, said flange means including means frictionally engageable with said engaging means for preventing relative axial and rotational movement between said flange means and said rim member, and means located along the axis of said contact wheel for providing a clamping force for selectively removably holding said flange means in frictional engagement with said engaging means.

14. A contact wheel comprising: a disposable rim member having an annular band member of a hard material and a soft, flexible annular ring of an elastomeric material supported upon and fixed to the outer surface of said band member, a thin coating of a tough, resilient material covering the exposed surface of said soft ring, flange means located within said rim member for radially supporting said rim member and being selectively movable into and out of engagement with said rim member, said rim member having engaging means fixed to said band member for being engaged by said flange means, said flange means including means frictionally engageable with said engaging means for preventing relative axial and rotational movement between said flange means and said rim member, and means located along the axis of said contact wheel for providing a clamping force for selectively removably holding said flange means in frictional engagement with said engaging means.

15. A contact wheel comprising: a disposable rim member having an annular band member of a hard material and a soft, flexible annular ring of an elastomeric material supported upon and fixed to the outer surface of said band member, flange means located within said rim member for radially supporting said rim member and being selectively movable into and out of engagement with said rim member, said rim member having engaging means fixed to said band member for being engaged by said flange means, said flange means including means frictionally engageable with said engaging means for preventing relative axial and rotational movement between said flange means and said rim member, and means located along the axis of said contact wheel for providing a clamping force for selectively removably holding said flange means in frictional engagement with said engaging means.

References Cited by the Examiner

UNITED STATES PATENTS

| 328,158 | 10/1885 | Wardwell | 74—230.7 |
| 1,016,158 | 1/1912 | Karr | 74—230.18 |
| 1,645,552 | 10/1927 | Tannewitz | 74—230.7 |
| 2,643,549 | 6/1953 | Whilesell | 74—230.7 |
| 2,806,379 | 9/1957 | Haracz | 74—230.3 |

FOREIGN PATENTS

| 212,734 | 2/1958 | Australia. |
| 1,101,559 | 4/1955 | France. |

OTHER REFERENCES

German printed application No. 1,042,416, October 1958.

DAVID J. WILLIAMOWSKY, *Primary Examiner*.

J. A. WONG, *Assistant Examiner*.